United States Patent Office 3,138,633
Patented June 23, 1964

3,138,633
SYNTHESIS OF β-CYANOVINYL AMMONIUM HALIDES
Frank Scotti, Stamford, Conn., and Everett Joseph Frazza, Yorktown Heights, N.Y., assignors to American Cyanamid Company, New York, N.Y., a corporation of Maine
No Drawing. Filed Nov. 29, 1960, Ser. No. 72,296
1 Claim. (Cl. 260—465.5)

This invention relates to β-cyanovinyl ammonium halides and to a process for preparing the same. More particularly, it relates to β-cyanovinyl ammonium chlorides and to a process for preparing the same in good yield from readily available starting materials.

In accordance with this invention, β-cyanovinyl ammonium halides which may be represented by the formula:

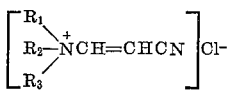

in which $R_1$, $R_2$, and $R_3$ are each selected from the group consisting of saturated alkyl hydrocarbon radicals having from two to twelve carbon atoms are prepared by reacting a tertiary alkyl amine, having from two to twelve carbon atoms in the alkyl chain with β-chloroacrylonitrile under controlled temperature conditions. The resultant quaternary halide is then isolated from the reaction mixture by precipitation usually induced by cooling of the reaction mixture. Subsequent filtration, centrifugation or other conventional method of recovery is employed to remove the precipitated β-cyanovinyl ammonium chloride from the reaction mixture.

In application Serial No. 704,882, filed December 24, 1957, in the names of Everett J. Frazza and Lorence Rapoport, and now abandoned, and in a copending application, which is a continuation-in-part of that application, Serial No. 252,308, filed January 18, 1963 in the names of Everett J. Frazza and Lorence Rapoport, there is disclosed what was considered to be a reasonable assumption of the course of the reaction at elevated temperatures of β-chloroacrylonitrile with various tertiary alkyl amines having from two to twelve carbon atoms in the alkyl chain. Although the existence of a quaternary halide was postulated in the reaction scheme as an intermediate, such a quaternary halide if, in fact, it existed was unable to be isolated from the reaction mixture since this intermediate was almost instantaneously converted into the corresponding β-cyanovinyl dialkyl amine hydrochloride. Moreover, the fact that an olefin was evolved during the course of the conversion of the quaternary halide to the β-cyanovinyl dialkyl amine hydrochloride further substantiated the theory of the instability of the postulated quaternary halide at the temperatures employed in the preparation of the final products, i.e., dialkyl β-cyanovinyl amines.

However, it has now been discovered that the reaction of β-chloroacrylonitrile with various tertiary alkyl amines having from two to twelve carbon atoms in the alkyl chain is one of wider applicability then had been originally anticipated. Broader extension of the inventive concept has been made possible by the discovery that the quaternary halide intermediate can be produced in good yield by maintaining the temperature of the reaction mixture at a level whereby olefin formation is suppressed.

It is a feature of this invention that β-chloroacrylonitrile may be reacted with various tertiary alkyl amines to obtain the resultant novel quaternary halides in substantial yield. Tertiary alkyl amines in which the alkyl group is ethyl, propyl, isopropyl, butyl, isobutyl, sec-butyl, isoamyl, hexyl, 2-ethylhexyl, n-octyl, t-octyl, dodecyl and the like are illustrative of those which may be employed. It is essential that the process be conducted at a temperature below about 80° C. Such control of temperature is imperative in order to forestall the formation of olefin, which takes place above this temperature. Although the temperature employed in the process is dependent to some extent upon the particular tertiary amine which is used as the reactant, it is further necessary that the temperature of the reaction be kept above about 50° C. since below this temperature little reaction has been noted to take place. Preferably, the temperature employed in the process is between about 50° C. and 70° C.

The process of this invention is readily conducted in the absence of a solvent and, as a practical manner, will generally be so conducted. However, if for some reason it is desirable to employ a solvent, any of the conventional materials, inert to the reactants, generally employed in this capacity are suitable. Preferably such materials are non polar and high boiling. Chlorinated aliphatic hydrocarbons such as carbon tetrachloride and trichloroethylene, aromatic hydrocarbons such as benzene and its homologs and halogenated derivatives; amides such as dimethyl formamide; esters such as ethyl acetate; ethers such as dioxane may all be used.

The compounds of this invention are useful as intermediates in the preparation of other compounds particularly, in the preparation of certain of the dialkyl β-cyanovinyl amines the process for which is disclosed and claimed in application Serial No. 704,882, now abandoned, and in copending application Serial No. 252,308, to which reference has already been made hereinabove.

In order to illustrate the present invention, the following examples are given:

EXAMPLE I

β-Cyanovinyltriethyl Ammonium Chloride

Into a suitable reaction vessel equipped with a reflux condenser, stirrer and thermometer, is introduced a solution comprising 8.7 parts (.1 mole) of β-chloroacrylonitrile and 10.1 parts (0.1 mole) of triethyl amine and 30 parts of anhydrous toluene. The reaction mixture is heated to 50° C. for 30 minutes. The reaction mixture is then cooled and β-cyanovinyltriethyl ammonium chloride is precipitated therefrom. Recrystallization from ethanol yielded a white crystalline material.

Analysis for $C_9H_{17}N_2Cl^-$.—Theory: C 57.28, H 9.08, N 14.85. Found: C 57.09, H 9.27, N 15.03.

EXAMPLE II

β-Cyanovinyltridodecyl Ammonium Chloride

The procedure of Example I is repeated except that equimolecular quantities of β-chloroacrylonitrile and tridodecyl amine are employed and the temperature of the reaction mixture is maintained at 50° C. A good yield of product is obtained.

We claim:
A β-cyanovinyl ammonium chloride of the formula

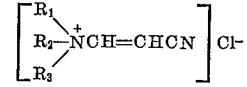

in which $R_1$, $R_2$, and $R_3$ are each selected from the group of saturated alkyl hydrocarbon radicals having from two to twelve carbon atoms.

References Cited in the file of this patent
UNITED STATES PATENTS 2,459,420  Erickson _____ Jan. 18, 1949
3,001,995  Frazza et al. _____ Sept. 26, 1961

OTHER REFERENCES

Noller, "Chemistry of Organic Compounds," 2nd edition, 1957, pages 229–230, 237.